(12) United States Patent
Tian et al.

(10) Patent No.: US 10,499,054 B2
(45) Date of Patent: Dec. 3, 2019

(54) SYSTEM AND METHOD FOR INTER-FRAME PREDICTIVE COMPRESSION FOR POINT CLOUDS

(71) Applicant: Mitsubishi Electric Research Laboratories, Inc., Cambridge, MA (US)

(72) Inventors: Dong Tian, Boxborough, MA (US); Eduardo Pavez, Cambridge, MA (US); Robert Cohen, Somerville, MA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 76 days.

(21) Appl. No.: 15/876,522

(22) Filed: Jan. 22, 2018

(65) Prior Publication Data

US 2019/0116357 A1 Apr. 18, 2019

Related U.S. Application Data

(60) Provisional application No. 62/571,388, filed on Oct. 12, 2017.

(51) Int. Cl.
*H04N 19/105* (2014.01)
*H04N 19/124* (2014.01)
(Continued)

(52) U.S. Cl.
CPC .......... *H04N 19/105* (2014.11); *G06T 9/001* (2013.01); *G06T 9/004* (2013.01); *G06T 9/007* (2013.01);
(Continued)

(58) Field of Classification Search
CPC .... H04N 19/105; H04N 19/96; H04N 19/124; H04N 19/91; H04N 19/597; H04N 19/90;
(Continued)

(56) References Cited

U.S. PATENT DOCUMENTS 7,894,525 B2 2/2011 Piehl et al.
2016/0086353 A1 3/2016 Lukac et al.
(Continued)

OTHER PUBLICATIONS

Han et al., "Time Varying Mesh Compression using an Extended Block Matching Algorithm," IEEE Transactions on Circuits and Systems for Video Technology, Institute of Electrical and Electronics Engineers, US, vol. 17, No. 11, Nov. 1, 2007. pp. 1506-1518.
(Continued)

*Primary Examiner* — Jared Walker
(74) *Attorney, Agent, or Firm* — Gennadiy Vinokur; James McAleenan; Hironori Tsukamoto (57) ABSTRACT

A point cloud encoder including an input interface to accept a dynamic point cloud including a sequence of point cloud frames of a scene. A processor encodes blocks of a current point cloud frame to produce an encoded frame. Wherein, for encoding a current block of the current point cloud frame, a reference block is selected similar to the current block according to a similarity metric to serve as a reference to encode the current block. Pair each point in the current block to a point in the reference block based on values of the paired points. Encode the current block based on a combination of an identification of the reference block and residuals between the values of the paired points. Wherein the residuals are ordered according to an order of the values of the points in the reference block. A transmitter transmits the encoded frame over a communication channel.

17 Claims, 5 Drawing Sheets

(51) Int. Cl.

| | |
|---|---|
| *H04N 19/176* | (2014.01) |
| *H04N 19/54* | (2014.01) |
| *H04N 19/60* | (2014.01) |
| *H04N 19/119* | (2014.01) |
| *H04N 19/14* | (2014.01) |
| *H04N 19/62* | (2014.01) |
| *H04N 19/147* | (2014.01) |
| *H04N 19/91* | (2014.01) |
| *G06T 15/08* | (2011.01) |
| *G06T 9/00* | (2006.01) |
| *H04N 19/597* | (2014.01) |
| *H04N 19/96* | (2014.01) |
| *G06T 17/00* | (2006.01) |

(52) U.S. Cl.
CPC .......... *G06T 15/08* (2013.01); *H04N 19/119* (2014.11); *H04N 19/124* (2014.11); *H04N 19/14* (2014.11); *H04N 19/147* (2014.11); *H04N 19/176* (2014.11); *H04N 19/54* (2014.11); *H04N 19/597* (2014.11); *H04N 19/62* (2014.11); *H04N 19/649* (2014.11); *H04N 19/91* (2014.11); *H04N 19/96* (2014.11); *G06T 17/005* (2013.01); *G06T 2207/10028* (2013.01)

(58) Field of Classification Search
CPC .... H04N 19/649; H04N 19/61; H04N 19/176; H04N 19/54; G06T 2207/10028; G06T 17/005; G06T 15/08; G06T 9/007; G06T 9/001; G06T 9/004
See application file for complete search history.

(56) References Cited

U.S. PATENT DOCUMENTS

| | | |
|---|---|---|
| 2017/0032220 A1 | 2/2017 | Medasani et al. |
| 2017/0347120 A1* | 11/2017 | Chou ................... H04N 19/597 |
| 2017/0372527 A1* | 12/2017 | Murali ................... G06T 19/20 |

OTHER PUBLICATIONS

Xu et al., "Intra Block Copy in HEVC Screen Content Coding Extensions," IEEE Journal on Emerging and Selected Topics in Circuits and Systems, IEEE, Piscataway, NJ. vol. 6, No. 4, Dec. 1, 2016. pp. 409-419.

Birendra et al., "Dynamic Geometry Compression with Binary Tree Based Prediction and Residual Coding," 118. MPEG Meeting, Apr. 3, 2017-Apr. 7, 2017. Hobart, Motion Picture Expert Group ISO/IEC, No. m40607, Mar. 31, 2017.

De Queiroz et al., "MPEG 115th Meeting Geneva, attached to input document m38675," MPEG 115th Meeting Geneva. May 25, 2016.

Cohen et al., "Point Cloud Attribute Compression using 3D Intra Prediction and Shape Adaptive Transforms," 2016 Data Compression Conference IEEE. Mar. 30, 2016. pp. 141-150.

Zhang et al., "Point Cloud Attribute Compression with Graph Transform," 2014 IEEE International Conference on Image Processing (ICIP), IEEE, Oct. 27, 2014. pp. 2066-2070.

Birenda et al., "Embedded Binary Tree for Dynamic Point Cloud Geometry Compression with Graph Signal Resampling and Prediction," 2017 IEEE Visual Communications and Image Processing (VCIP) Dec. 10, 2017. pp. 1-4.

Compression of Dynamic 3d Point Clouds Using Sub-divisional Meshes and Graph Wavelet Transforms (a Non Patent Literature, Author: Aamir Anis, Philip A. Chou, Antonio Ortega).

* cited by examiner

SYSTEM AND METHOD FOR INTER-FRAME PREDICTIVE COMPRESSION FOR POINT CLOUDS

FIELD

Embodiments of the present disclosure include methods and encoders relating to analysis, interpolation and representation of point cloud signals, and more particularly, to point cloud processing and compression.

BACKGROUND

Point clouds are often acquired sequentially for the same scene, which include multiple moving objects. They are called dynamic point clouds as compared to static point clouds captured from a static scene or static objects. Dynamic point clouds are typically organized into frames, with different frames being captured at different times.

SUMMARY

Embodiments of the present disclosure include methods and encoders relating to analysis, interpolation and representation of point cloud signals, and in particular, to point cloud processing and compression.

Point cloud signals resemble conventional video signals in some aspects, since both are composed of a set of sampling points. In video signals, each sampling point is often referred as a pixel, while in point cloud signals, each sampling point corresponds to a point in the 3D world. Moreover, both signals may be captured from the same scene and hence for both signals there exist redundancies between neighboring frames.

Regarding to compression tasks, it might be rather easy to start trying to apply similar principles from inter-frame prediction in video compression to point cloud compression, however, this is a non-trivial task due to the following facts.

In conventional video compression, the sampling points (pixels) are located on an implicit and regular grid. In other words, a regular grid is just obtained by arranging the sampling point (pixel) locations together in the video signal, and there is not much useful information in the grid. Hence, the signaling of the pixel locations is rather straightforward and could be done via high-level syntaxes. Instead, the task in video compression focuses on efficient coding of the intensity and/or color information associated with each sampling point (pixel).

Different from video compression, for point cloud compression, however, it becomes challenging to code the sampling point locations. This is because the sampling points in point clouds do not live on any regular grids. By arranging points together solely based on their locations, the point cloud signals could represent geometric properties of the scenes, even with the information associated with sampling points being removed. This fact makes the compression of geometric information of the sampling points in point clouds a unique task compared to conventional video compression. Of course, based on the compressed sampling locations, compression on the associated attributes, if available, may be required for some applications in addition to the geometric information of a scene. Compression of attributes is a secondary task in this work.

Furthermore, in video compression, motion is utilized for efficient coding between neighboring frames via motion estimation/compensation. When applying the idea of motion estimation/compensation to dynamic point clouds, at least one major challenge arises from the fact that the points are sampled on an irregular grid. The varying distributions of point locations make the geometric prediction from some reference points a non-trivial task.

Some embodiments of the present disclosure use a block-based coding framework where a point cloud frame is first partitioned into blocks, called a coding unit. In this way, the codec is able to choose different coding modes or parameters for different coding units. Such coding choices are decided based on a rate-distortion optimization.

Then, for each coding unit block, we propose geometric predictive coding approaches using previously coded frames as references. In addition, a graph transform coding is proposed to compress the residual that is the remaining information after the predictive coding.

DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Overview

Some embodiments of the present disclosure include a block-based coding framework, where a current input point cloud frame can be encoded or decoded and a reference point cloud frame is a previously encoded or decoded. A reconstructed point cloud is accessible for the reference point cloud. The reference frame may be coded using the proposed methods in this embodiment or any other approaches.

The dynamic point cloud falls within a bounding box, and the points and its attributes are organized using an octree structure with a maximum depth. Points in the current point cloud frame are organized into multiple coding units according to cubic blocks (voxel) whose size is specified at a dynamic point cloud level, e.g. it can be 8×8×8, 16×16×16, etc.

Then, for each coding unit block, the present disclosure proposes predictive coding approaches for the geometric information using a reference point cloud frame, which assumes invariant geometric surfaces over temporal directions. The geometric surfaces are the 3D structure represented by the point samples.

In addition, a graph transform coding can be proposed to compress the residual that is the remaining information after the predictive coding.

Block-Based Inter-Frame Predictive Coding

Figure 1:
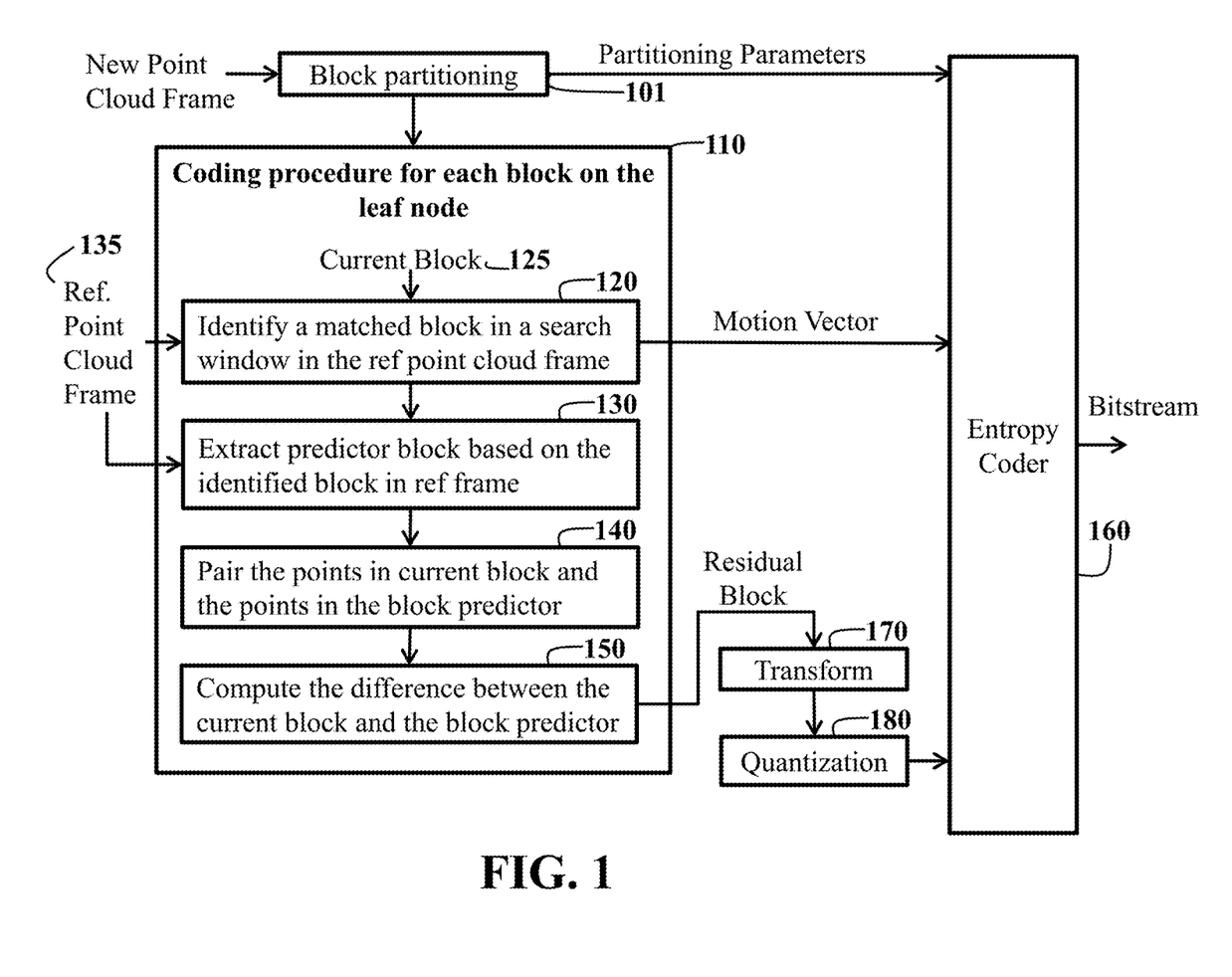
FIG. 1 is a block diagram illustrating a method for a block-based predictive coding for point cloud compression, according to an embodiment of the present disclosure.

Some embodiments of the present disclosure propose a novel predictive coding approach for a current point cloud frame, assuming that at least another point cloud frame was coded at an earlier time, and they are available as a reference point cloud frame. FIG. 1 shows the block diagram of the proposed approach.

Step 1 (block 101): Partition the point cloud frame into coding units, 3D blocks. In at least one example, the partitioning could be done using octree decomposition, and it splits the point cloud from the middle position along x, y and z directions. At least one aspect of this method is low-complexity as it does not need intensive analysis on the point cloud content. The partitioning parameters can include the octree decomposition depth level and block occupancy indications. Wherein the occupied blocks will be an actual coding unit.

With a second partitioning approach, the splitting position is adaptively selected along the object edges or planes. Furthermore, the splitting direction may not be limited to x, y and z directions but arbitrary directions. With the adaptive splitting, the partitioning parameters will additionally include splitting positions and directions, compared to the above low-complexity partitioning approach. The advanced embodiments of methods of the present disclosure would produce better predictors and smaller residuals to be coded in the end. A method of plane/edge detection in the point clouds is out of the scope of this particular embodiment.

After the partitioning is done, the partitioned blocks are to be coded one by one (block 110).

Step 2 (block 120): Take the current coding unit (block 125) and a predefined searching window in the reference point cloud frame (block 135) as input. A block of points from the searching window in the reference point cloud frame is to be identified, that is called reference block hereinafter. Note that the reference point cloud frame is its reconstructed version from the coding process.

The output from this step can be a set of matching parameters that may include a motion vector (3D vector) and resampling parameters.

Typically, the reference block may have a different number of points from the current block. So, a resampling procedure can be required to align the number of points in the reference block to the current block. In a low-complexity implementation, the present disclosure proposes to sort the points in the reference block then pick the first few points so there are the same number of points in the current block. The sorting procedure is based on the point distance to an anchor position of the block, e.g. the top-left-front corner of the block.

When searching for a reference block, the similarity criteria can be defined based on a point-to-point distance, where the distance between nearest neighboring points from the reference block and the current block are used.

To promote the surface structures in the point clouds, the present disclosure proposes using a point-to-plane distance for the similarity criteria, where the point-to-point error is projected along the normal direction. The point-to-plane distance might be further replaced by a complex point-to-model distance where a 3D model (or mesh) is constructed from one of the point clouds and the distance to the model is used. However, considering the high computational complexity involved with the point-to-model distance, in one embodiment, point-to-plane distance is preferred.

In another embodiment of the present disclosure, the searching criteria is not only decided by the similarity evaluation, but also the cost to code the motion vector (motion model). The two factors are proposed to be added using a weighting parameter.

Step 3 (block 130): Extract a reference block that is to be used as a predictor for the current block. The points in the reference block could be used as predictors. Alternatively, a surface-based prediction will be described in a later section that modifies the points before using them as predictors.

Step 4 (block 140): For predictive coding in video, the extracted block from the reference frame can be used as predictors directly, as all pixels are sampled on a regular grid and it is straightforward to pair the pixels between the reference block and the current block. However, in 3D point clouds, the point samples can be at arbitrary locations, and hence it is non-trivial to pair the points in the current block with the points in the reference block to perform the point location prediction. Details of the pairing procedure will be described later.

Step 5 (block 150): Compute the difference between every point pair between the reference block and the current block. Such residual block typically involves three directions, i.e. x, y and z directions. In the end, the residual block is sent to an entropy coder. An advanced coding approach on the residual block is to be described in a later section.

Step 6 (block 170): Perform transform on the residual block. The present disclosure proposes a graph based transform that is adapted based on the reference block (see text below).

Step 7 (block 180): Conduct quantization on the transformation coefficients, and the quantized coefficients are entropy coded (block 160).

Although the above approach can be designed for inter prediction between point cloud frames, it could be adapted for prediction within the same point cloud frame by specifying the searching window to be the already "coded" partition of the current point cloud frame, depending upon the application.

For simple dynamic point clouds, it is also possible to apply the above principles with the whole point cloud frame being partitioned into a single block.

In addition, the motion is assumed to be only from translational motion in the description. However, nothing prevents an advanced motion embodiment to be utilized that includes a motion vector for translation, a rotation matrix for rotation motion and a scaling parameter for zoom in/out motion.

Surface-Based Block Prediction

The present disclosure already proposed using the extracted reference block to predict the current block directly (block 130). An aspect of this method is that it may not be efficient due to sampling noises when acquiring the point clouds. On the other hand, it is often the case that the surface structure represented by a reference block and the current block resemble each other. To take advantage of this fact, the present disclosure proposes a surface-based block prediction method, as shown in FIG. 4.

Figure 4:
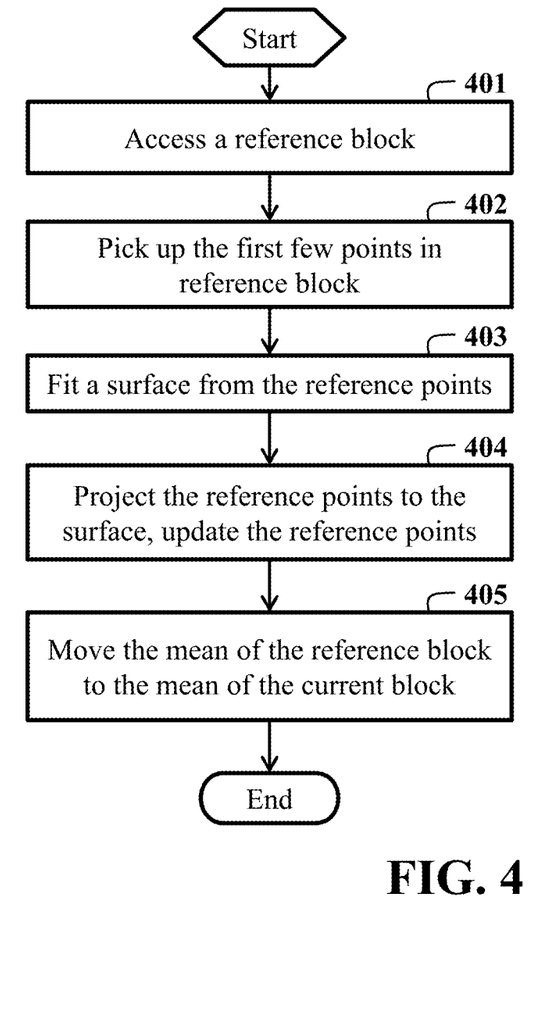
FIG. 4 illustrates the block diagram of a proposed surface-based block prediction for point clouds, according to some embodiments of the present disclosure.

Referring to FIG. 4, a mean position $P_M$ of a block B is defined as the averaged position of all points of the block, $$P_M = \frac{1}{N} \sum_{P_i \in B} P_i, \quad (1)$$

where $P_i \in R^3$ is the location of point i.

A center position $P_C$ of a block B is defined as per the size of the block, $$P_C = P_0 + S/2, \quad (2)$$

where $P_0 \in R^3$ indicates the left-top-front corner of the block, $S \in R^3$ indicates the size of the block, and $\{P_0, P_0+S\}$ indicates the cubic space of the block.

The proposed surface-based block prediction is composed of the following steps.

Still referring to FIG. 4, step 1, access (block 401) the reference block.

Step 2, pick up (block 402) the first few points in the reference block, so that there are the same number of points in the reference block as in the current block, as described in the first subsection.

Step 3, fit (block 403) a surface from the reference block. In a low-complexity implementation, the surface can be a plane represented by its normal.

Still referring to FIG. 4, step 4, project (block 404) all points in the reference block to the fitted surface. Update the reference block with the projected new points. The reference block is represented in a local coordinate system, with mean position of the block being (0, 0, 0).

Step 5, move (block 405) the mean of the reference block to the mean $P_M$ of the current block. For this purpose, an anchor position $P_A$ is first selected, e.g. the top-left-front corner $P_0$ of the block or the center point $P_C$ of the block. The anchor position selection should not depend on the points in the current block, since it needs to be available before decoding the points in the current block. At the encoder, an offset vector is computed from the anchor position of the current block to the mean position, $$V_{offset} = P_M - P_A. \quad (3)$$

The predictor points obtained from previous step are updated by adding the anchor position $P_A$ and the offset vector $V_{offset}$.

According to an embodiment of the present disclosure, the 3D offset vector $v_{offset}$ is coded into a bitstream. In another implementation, it is first projected to the normal direction of a plane fitted from the reference block, and then the amount of the projected offset is coded into a bitstream. At the decoder, the offset vector would be recovered based on this amount and the normal. The latter approach may shift the whole block along the plane.

Pairing Points between Reference and Current Block

Figure 2:
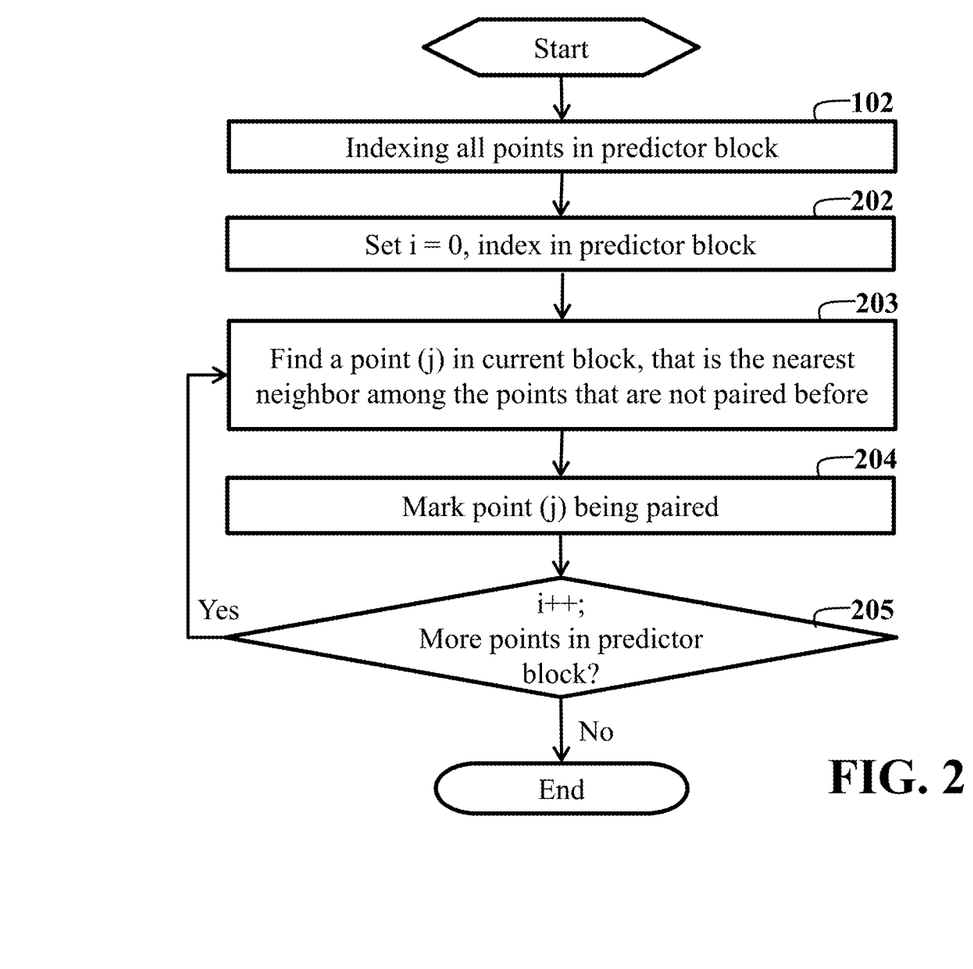
FIG. 2 is a flow diagram of a method to establish point predictor in a block predictor, according to some embodiments of the present disclosure.

After obtaining the reference block, the points in the reference block need to be paired with the points in the current block, so that each point in the current block could be predicted by its paired point in the reference block. For the pairing procedure, an "unused nearest neighbor" search is proposed, as illustrated in FIG. 2.

First, we assign (block 201) an index number to each point in the reference block. The actual order of the index does not matter in this procedure, as long as the same indexing approach is in force for both encoder and decoder.

Then, for every point (block 202, 205) in the reference block, we propose to identify (block 203) a nearest neighbor in the current block that was not paired to any point in the reference block before. Once a point in the current block is identified, it is paired to the current point in the reference block, and it is marked (block 204) as being paired so that it won't be paired/predicted again. Note that the searching procedure is only needed for an encoder, and not needed for the decoder.

Finally, for many applications, the point appearance order in the bitstream does not matter and no side information need to be transmitted. However, if it is not the case for some applications, and the output order of points needs to be restored, then the reordering of points in the current block could be signaled to the decoder.

Block Based Graph Transform Coding

After the residual block is obtained, one can optionally apply a transform (block 170 of FIG. 1) before performing quantization, e.g. conventional DCT transform. In order to favor the coding efficiency, we propose to apply a graph transformation on the residual block before entropy coding.

The points in the residual block appear in a 3-dimensional space, and it is not straightforward to design a transformation coding. One naive way is to arrange the points into a 1D array and apply any 1D transformation on it. However, this approach does not consider the relationship of the points in 3D space and is not optimal in terms of performance.

In the process of block 140, point pairs between reference block and the current block are determined. Here we propose to utilize this relationship to design an advanced graph transform coding.

In particular, we propose to build a K-NN graph based on the reference block: each point in the reference block is treated as a graph node. "K" nearest neighbors in the reference block are connected with graph edges. The weights of the graph edges are assigned based on their Euclidean distances. This is illustrated in block 301 in FIG. 3. A τ-NN graph may be used instead, where the points within a radius of τ are connected to a current point. Using a K-NN graph is easier to maintain the transform complexity by setting the sparsity of the graph, while using a τ-NN graph is more aligned with the physical relationships between points.

Figure 3:
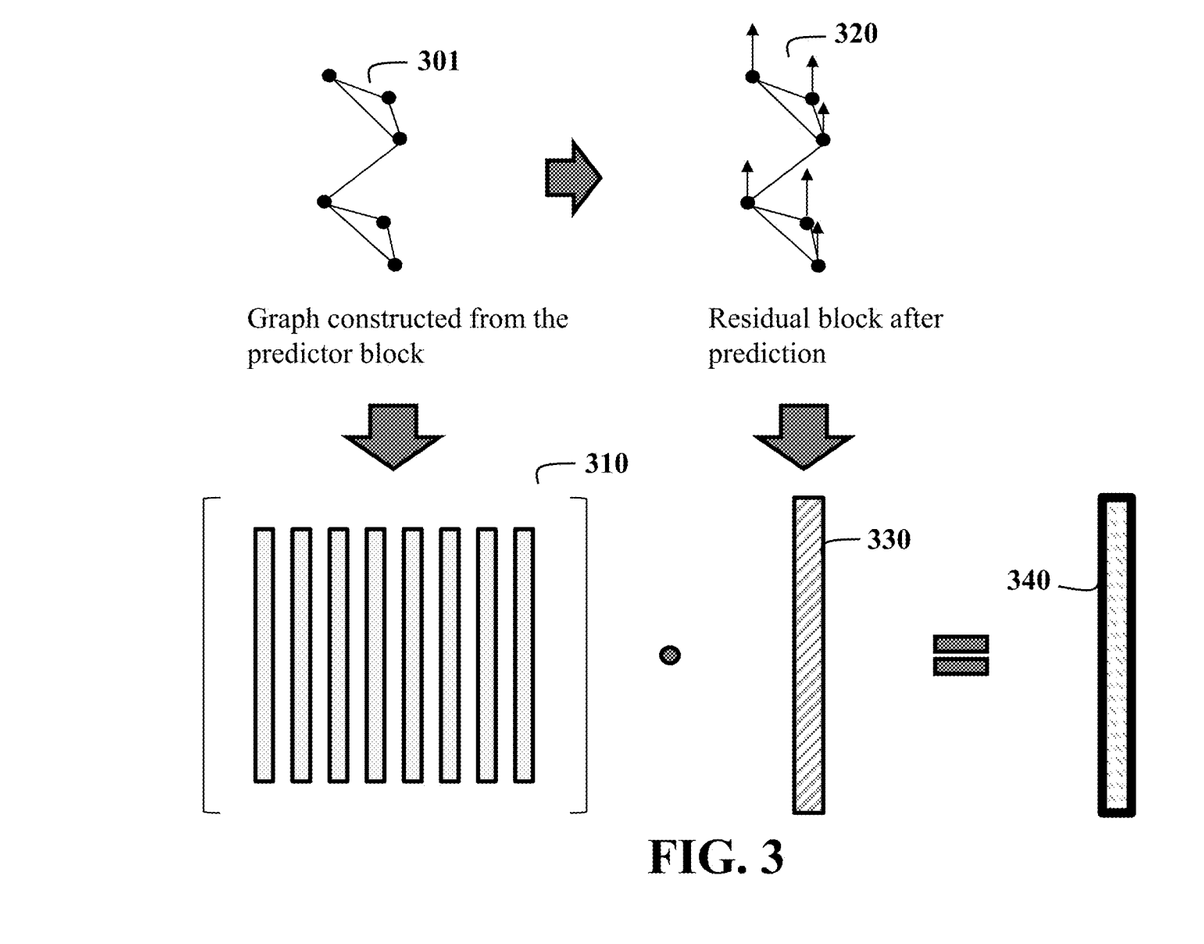
FIG. 3 illustrates how the graph construction based on the reference block is used to perform graph transform coding on the current block, according to some embodiments of the present disclosure.

After the graph is constructed, a preferred graph operator, for example, graph adjacency matrix, graph Laplacian matrix, could then be determined. In this embodiment, we select the graph Laplacian matrix as a preferred graph operator.

Using the constructed graph, a graph Fourier transform (GFT), as illustrated by block 310, is then derived by conducting an eigen-decomposition on the selected graph operator.

Next, the arrow on each point in block 320 represents point attributes that are to be coded. For example, it can represent the value of x, y or z location, or it can be a component from r, g and b color channel or any other attributes to be coded. It would be vectorized as block 330.

Finally, the graph Fourier transform (GFT) is applied on the residual block, which can compact the energy in the residual block. Last, the GFT coefficients (block 340) would be quantized and then sent to an entropy coder for producing the final bitstream. It is worthy to point out that because the points in the reference block and the current block are paired as described before, we can apply the graph constructed from the reference block on the current residual block to be coded.

Surface-Aware Coding for Residual Blocks

Typically, the residual information between a reference point and a current point is represented by a 3D residual vector, with each dimension corresponding to x, y or z direction. It is often found inefficient to code such 3D residual vectors for all points. Here we propose a surface-aware coding method for a current point, as shown in FIG. 5.

Figure 5:
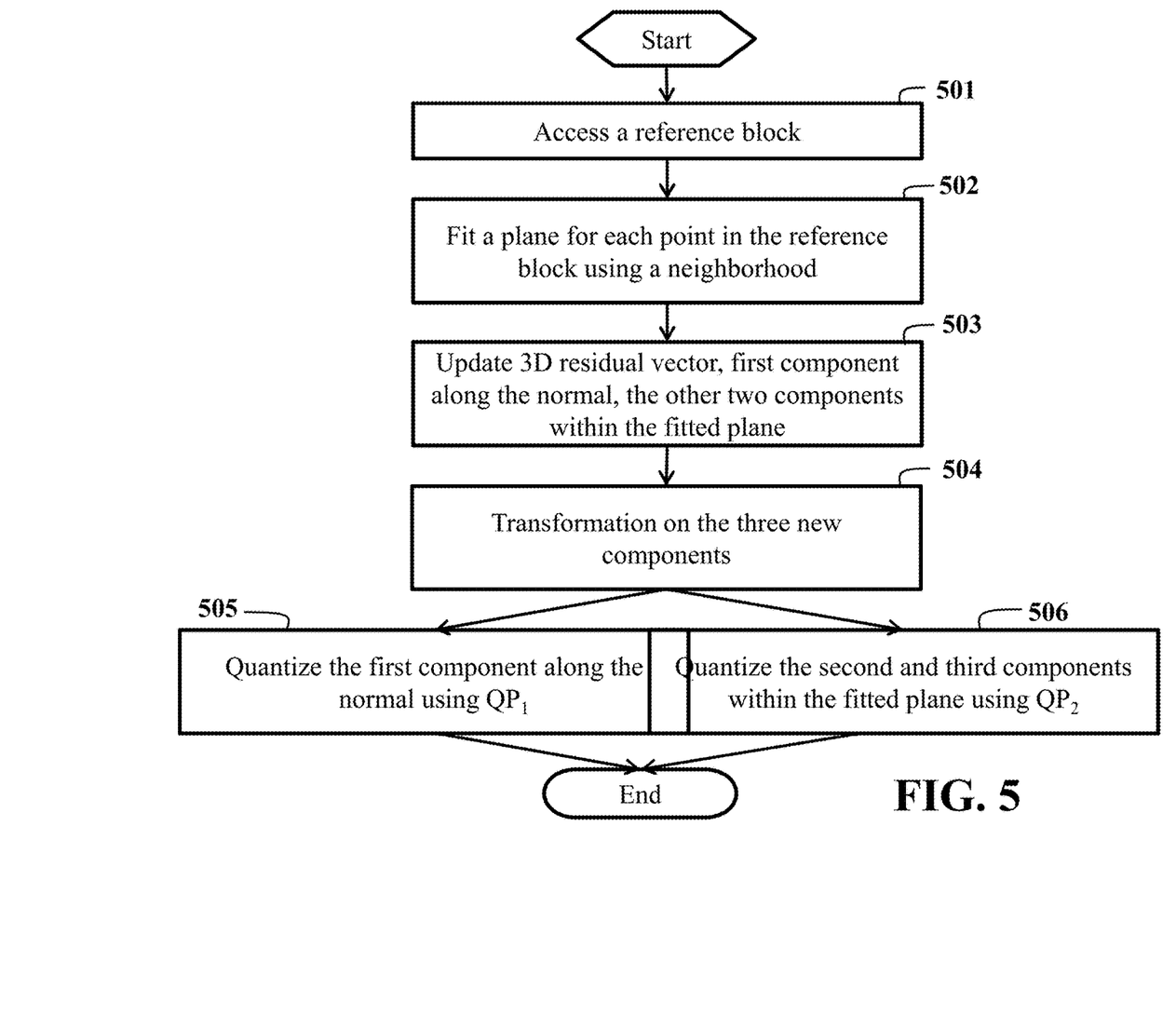
FIG. 5 shows the block diagram of surface-aware coding for residual blocks, according to some embodiments of the present disclosure.

Referring to FIG. 5, step 1, fit (block 502) a local plane based on the neighborhood of the corresponding point paired with the current point.

Step 2, update (block 503) the 3D residual vector, with one dimension along the normal direction and the other two dimensions within the fitted plane.

Step 3, optionally, perform transformation (block 504) on the three dimensions of the updated 3D residual vector, and get the transformation coefficients for the three dimensions.

Still referring to FIG. 5, step 4, apply (block 505) a relative smaller (finer) quantization step $QP_1$ on the transform coefficients along the normal direction of the fitted plane, and apply (block 506) a relative larger (coarser) quantization step $QP_2 > QP_1$ on the two dimensions of the transform coefficients within the fitted plane. In an extreme implementation, the components within the fitted plane can be discarded by setting $QP_2 = \infty$.

At least one motivation of the proposed method is that the residual offset away from a local surface is more important than a shift within the local surface. That is, a minor shift of a point within the surface is often acceptable, while an error along normal direction of the surface predictor is critical.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, at least one aspect of the appended claims to cover all such variations and modifications that come within the true spirit and scope of the invention.

What is claimed is:

1. A point cloud encoder, comprising:
    an input interface to accept a dynamic point cloud including a sequence of point cloud frames of a scene;
    a hardware processor to encode blocks of a current point cloud frame to produce an encoded frame, wherein, for encoding a current block of the current point cloud frame, the hardware processor is configured to
        select a reference block similar to the current block according to a similarity metric to serve as a reference to encode the current block;
        pair each point in the current block to a point in the reference block based on values of the paired points;
        encode the current block based on a combination of an identification of the reference block and residuals between the values of the paired points, wherein the residuals are ordered according to an order of the values of the points in the reference block, and wherein a nearest neighbor graph is constructed representing the points of the reference block, such that each paired point in the reference block is a node in the nearest neighbor graph;
        perform an eigen-decomposition of the nearest neighbor graph to produce a graph transform operator;
        transform the residuals using the graph transform operator to produce graph transform coefficients;
        quantize and entropy code the graph transform coefficients; and
    a transmitter to transmit the encoded frame over a communication channel.

2. The encoder of claim 1, wherein the hardware processor selects the reference block from a point cloud frame coded prior to the current point cloud frame.

3. The encoder of claim 1, wherein the hardware processor selects the reference block from the current point cloud frame.

4. The encoder of claim 1, wherein the identification of the reference frame is a motion model including one or combination of a motion vector for translation motion, a rotation matrix for rotation motion, and a scaling parameter for zoom in/out motion.

5. The encoder of claim 1, wherein the similarity metric includes a sum of distances from points in the current block to a model of a surface formed by the points in the reference block.

6. The encoder of claim 1, wherein each residual is determined as a difference between the values of the paired points, such that each residual is a 3D vector.

7. The encoder of claim 1, wherein each residual is determined as a distance from a point in the current block to a surface formed at least in part by the paired point in the reference block, such that each residual is a scalar value.

8. The encoder of claim 7, wherein the surface is approximated as a plane.

9. The encoder of claim 1, wherein the hardware processor, is to perform the eigen-decomposition, and is configured to
    determine a graph operator of the nearest neighbor graph using one or combination of a graph adjacency matrix, and a graph Laplacian matrix; and
    perform the eigen-decomposition on the graph operator.

10. A method comprising:
    accepting a dynamic point cloud having a sequence of point cloud frames of a scene via an input interface;
    partitioning the point cloud frame into blocks using a hardware processor in communication with the input interface, wherein each block of the point cloud frame is encoded using the hardware processor, to produce an encoded frame based on
        selecting a reference block similar to the current block according to a similarity metric to serve as a reference to encode the current block;
        pairing each point in the current block to a point in the reference block based on the values of the paired points; and encoding the current block based on a combination of an identification of the reference block and residuals between the values of the paired points, such that the residuals are ordered according to an order of the values of the points in the reference block, and wherein constructing a nearest neighbor graph representing the points of the reference block, such that each paired point in the reference block is a node in the nearest neighbor graph;

performing an eigen-decomposition of the nearest neighbor graph to produce a graph transform operator;

transforming the residuals using the graph transform operator to produce graph transform coefficients;

quantizing and entropy code the graph transform coefficients; and transmitting the encoded frame over a communication channel via a transmitter in communication with the hardware processor.

11. The method of claim 10, wherein the selecting of the reference block from a point cloud frame coded is prior to the current point cloud frame.

12. The method of claim 10, wherein the selecting of the reference block is from the current point cloud frame.

13. The method of claim 10, wherein the identifying of the reference frame is by a motion model having one or combination of, a motion vector for translation motion, a rotation matrix for rotation motion, and a scaling parameter for zoom in/out motion.

14. The method of claim 10, wherein the similarity metric includes a sum of distances from points in the current block to a model of a surface formed by the points in the reference block.

15. The method of claim 10, wherein the processor, to perform the eigen-decomposition, is configured to
determine a graph operator of the nearest neighbor graph using one or combination of a graph adjacency matrix, and a graph Laplacian matrix; and
perform the eigen-decomposition on the graph operator.

16. A point cloud encoder, comprising:
an input interface to accept a dynamic point cloud including a sequence of point cloud frames of a scene;
a hardware processor to encode blocks of a current point cloud frame to produce an encoded frame, wherein, for encoding a current block of the current point cloud frame, the hardware processor is to
select a reference block similar to the current block according to a similarity metric to serve as a reference to encode the current block, wherein the similarity metric includes a sum of differences between the closest points in the current and reference block;
pair each point in the current block to a point in the reference block based on values of the paired points; and
encode the current block based on a combination of an identification of the reference block and residuals between the values of the paired points, wherein the residuals are ordered according to an order of the values of the points in the reference block, and wherein construct a nearest neighbor graph representing the points of the reference block, such that each paired point in the reference block is a node in the nearest neighbor graph;
perform an eigen-decomposition of the nearest neighbor graph to produce a graph transform operator, such that performing the eigen-decomposition includes determining a graph operator of the nearest neighbor graph using one or combination of a graph adjacency matrix or a graph Laplacian matrix, and then performing the eigen-decomposition on the graph operator;
transform the residuals using the graph transform operator to produce graph transform coefficients;
quantize and entropy code the graph transform coefficients; and
a transmitter to transmit the encoded frame over a communication channel.

17. The encoder of claim 16, wherein the reference block is selected from a point cloud frame coded prior to the current point cloud frame, and wherein when searching for the reference block, the similarity criteria is based on a point-to-point distance, that utilizes a distance between nearest neighboring points from the reference block and the current block.

* * * * *